Sept. 21, 1937.  M. B. REACH  2,093,737
SOLID PLAY BALL
Filed April 28, 1936

Inventor:
Milton B. Reach,
By Spear, Donaldson & Hall
Attorneys

Patented Sept. 21, 1937

2,093,737

UNITED STATES PATENT OFFICE 2,093,737

SOLID PLAY BALL

Milton B. Reach, Springfield, Mass., assignor to A. G. Spalding & Bros., New York, N. Y., a corporation of New Jersey Application April 28, 1936, Serial No. 76,810

5 Claims. (Cl. 273—58)

The object of this invention is to replace the present variable expensively constructed base ball as used in playgrounds and for soft ball, with one of uniform action and mechanized assembly.

Another object of the invention is to eliminate unevenness caused in a prior method by stitching the edges of the ball covering members, to insure a more even rebound of the ball at all parts of the ball surface.

In the drawing

Figure 1:
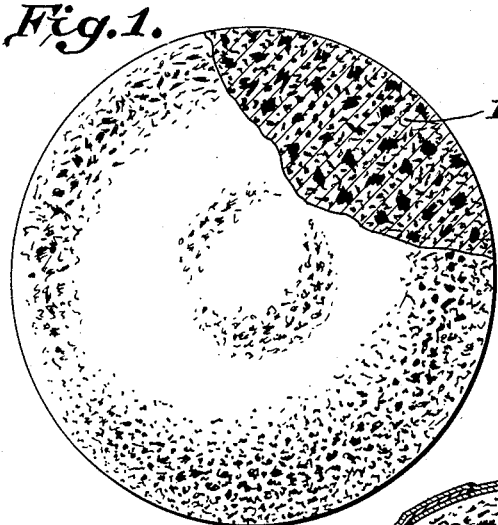
Figure 1 is a view of the moulded center part or core of the ball.
Figure 2:
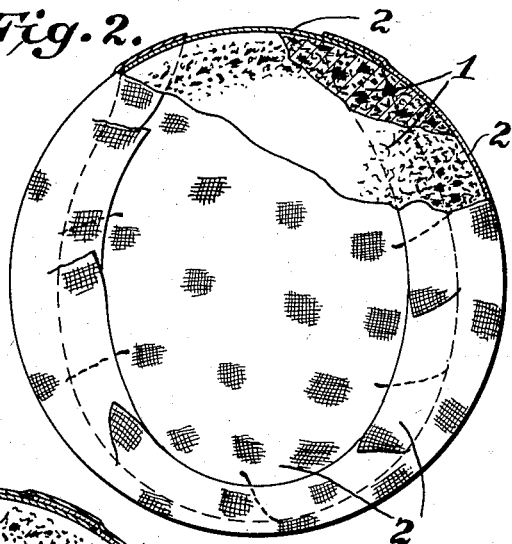
Fig. 2 is a view of a part of the ball structure showing the core covered with textile material adhesively secured thereto and with a portion broken away to show the covering layer.
Figure 3:
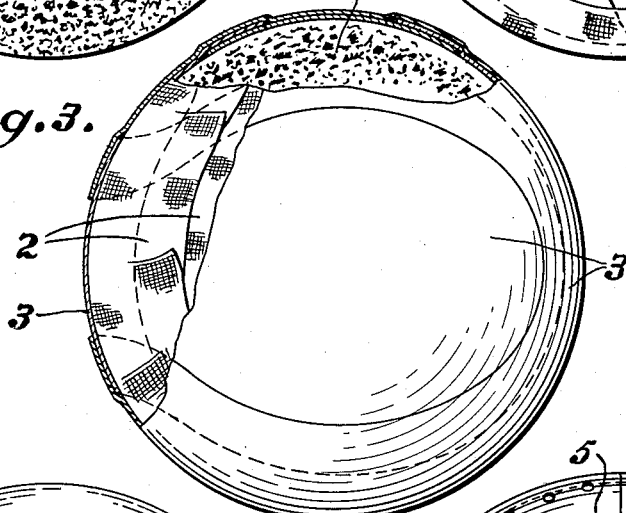
Fig. 3 is a similar view of the ball with a coating of uncured rubber applied thereto.
Figure 4:
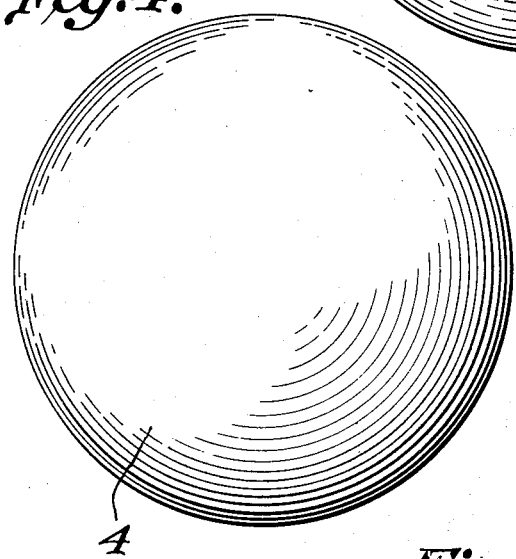
Fig. 4 shows the smooth surfaced ball structure resulting from a moulding cure of the structure of Fig. 3.
Figure 5:
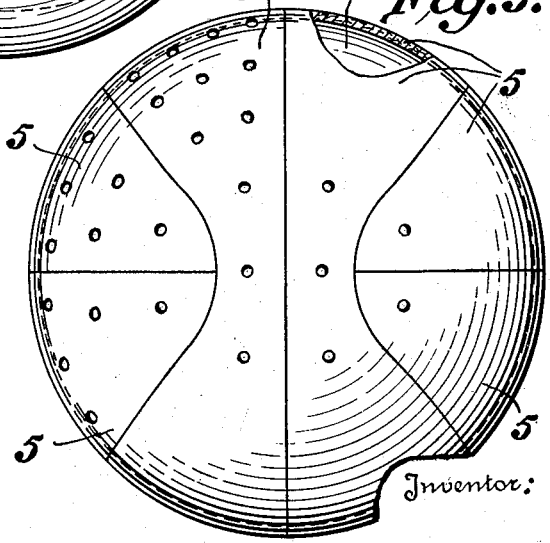
Fig. 5 shows the completed ball with leather veneer cover.

According to the invention, I provide a compounded moulded center part of material 1 suitable to insure proper weight for size, binding this center part against the shearing action of foul tips and twisting contacts, with overlapping layers of strong light textile material 2, such as balloon cloth which is woven and non-extensible, impregnated with a cement or compound having an affinity for the center part and capable of bonding therewith, covering this textile supporter 2 with a thin coating 3 of uncured rubber and submitting the assembly at this stage to a quick moulding cure. The thin coating of rubber may be applied in any suitable way, in sheet form or otherwise. The resultant product as shown at 4 is a smooth rubber covered fabricated foundation of uniform and controllable measurements for receiving the final leather veneer, it being understood that the rubber during the cure will flow and fill up and smooth over unevenness in the surface of the fabric.

The rubber surface is now coated with a curing rubber cement, the leather parts 5 are likewise cemented on back and edges and laid on the ball in multiple patterns with edges abutting and in adhesive contact. The ball may then be subjected to a final moulding operation to bond the parts integrally together. It is important to have the leathers split to uniform thicknesses to insure necessary smoothness at the joints. Under this construction I eliminate all forms of sewing or lacing and produce a ball of a durability far in excess of anything now on the market. In some instances I may perforate the cover to give control in pitching and provide frictional contact for perspiring hands.

In actual practice of assembly it has been found desirable to cover the ball with not less than four pieces of leather, for example, as shown in the drawing. As shown, the leather veneer may be in at least four pieces, and may comprise two figure eight formations each divided longitudinally. Baseball leather is not flexible enough to lay smoothly over the curving surface of a play ball in patterns substantially broader than indicated herein. There is also an objective in utilizing the smaller pieces of leather, because of the economy in the cutting of the hide.

Figure 6:
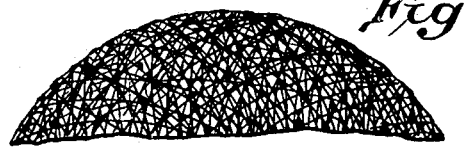
Fig. 6 shows a yarn winding as the textile material to which the rubber is applied.

In place of the balloon cloth or other textile material 2, a satisfactory substitute is provided by winding the ball with a light layer of yarn, either cotton or wool to form the layer 2 as shown in Fig. 6. The term textile material is intended to cover this.

I claim:

1. The hereindescribed method of making a play ball comprising moulding a substantially solid center part, covering the center part with textile material having associated therewith a substance having an affinity for the center part and bonding the textile covering to the center part, covering the textile material with a coating of uncured rubber, submitting the assembly to a moulding cure forming a smooth rubber surface, and adhesively applying leather veneer in a plurality of panels to the smooth moulded on rubber surface of the ball so formed.

2. The method according to claim 1 in which the smooth moulded on rubber surface and the pieces of leather veneer are coated with a curing rubber cement before applying the veneer, and after applying the veneer the covered ball is subjected to a final moulding operation bonding all parts integrally together.

3. A play ball of the solid type having a covering of pieces of textile fabric, disposed in overlapping relation, a covering of rubber moulded on the textile wall compensating for unevenness in the surface of the textile covering and having a smooth even exterior surface, and a veneer of leather panels cemented to the even surface of the moulded on rubber, said panels having abutted flush joints between their edges throughout the extent of said edges.

4. A play ball of the solid type having a moulded center part, a covering of textile material therefor, a covering of rubber moulded in bonded relationship to the textile material and having a smooth and even exterior surface, and leather panels of uniform thickness applied to the smooth even exterior surface of the moulded rubber, said leather panels being butted together throughout the extent of their edges with flush joints and adhesively held in place against the strains of play without the use of stitching or lacing.

5. A ball according to claim 4 in which said inner textile covering comprises a layer of yarn wound on the center part.

MILTON B. REACH.